G. O. CURME, Jr.
PROCESS OF PREPARING ETHYLENE DICHLORID.
APPLICATION FILED JUNE 3, 1916. RENEWED DEC. 12, 1917.
1,315,542.
Patented Sept. 9, 1919.
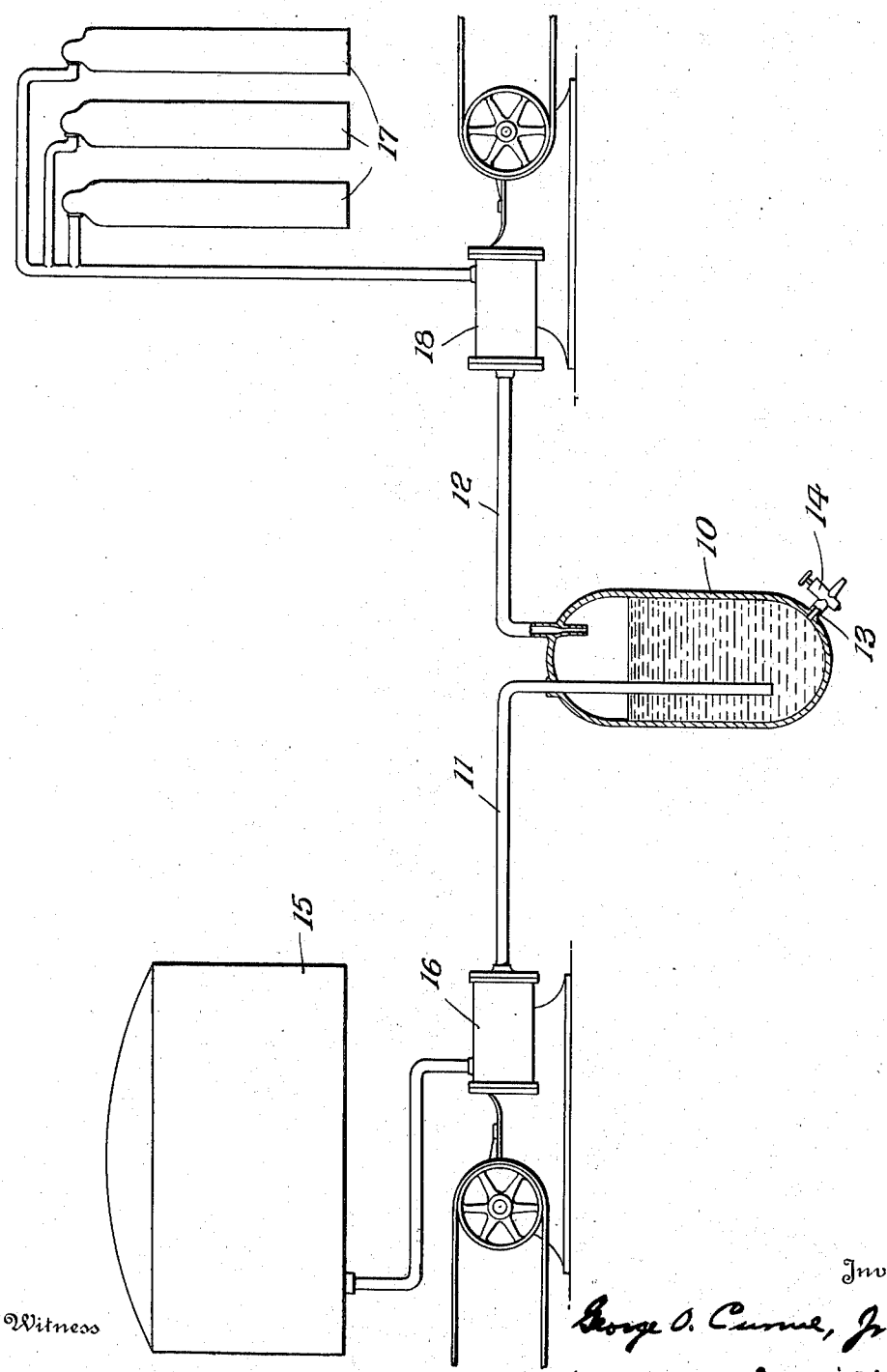

UNITED STATES PATENT OFFICE.

GEORGE O. CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

PROCESS OF PREPARING ETHYLENE DICHLORID.

1,315,542.  Specification of Letters Patent.  Patented Sept. 9, 1919.

Application filed June 3, 1916, Serial No. 101,637. Renewed December 12, 1917. Serial No. 206,848.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Processes of Preparing Ethylene Dichlorid, of which the following is a specification.

As is well known, in order to prepare ethylenedichlorid from ethylene, it is only necessary to bring the ethylene and chlorin together; under almost any conditions a reaction proceeds as per the equation $$C_2H_4 + Cl_2 \rightarrow C_2H_4Cl_2.$$

However, under all conditions, this reaction does not run rapidly and smoothly, with formation of a pure end-product. I have found that an especially favorable set of conditions for bringing about this reaction is obtained when conditions are chosen such as to present the chlorin in the liquid phase to the action of the ethylene in either the gaseous or liquid phase. The chlorin can be liquefied by sufficient compression or by sufficient reduction of temperature, or by both expedients applied at once; similarly the ethylene can be liquefied if desired.

My present invention consists, therefore, in the process for preparing ethylenedichlorid from ethylene and chlorin which is in the liquid condition, with the ethylene in either gaseous or liquid condition.

The accompanying drawing, which is made a part hereof, illustrates an apparatus such as has been found appropriate for the practice of said process, although the successful application of the process is not dependent on using this exact apparatus and must be varied as gaseous or liquid ethylene is used with the liquid chlorin. Said drawing shows the apparatus as used for liquid chlorin and gaseous ethylene.

The said apparatus consists of a vessel 10, with an inlet pipe 11 for gaseous ethylene leading nearly to the bottom of said vessel, and an inlet pipe 12 for the liquid chlorin, leading into the upper portion of said vessel, and an outlet pipe 13, with a valve 14, leading from the bottom of said vessel. An ethylene supply tank 15, compressor 16, a chlorin supply, comprising a battery of cylinders 17, and a compressor 18 completes the apparatus.

It will be understood that this merely illustrates an arrangement such as has been found practicable, but may be varied in any appropriate manner, for example the process easily lends itself to an arrangement for continuous operation.

The operation consists in leading gaseous ethylene, at a pressure greater than the vapor pressure exerted by the chlorin in the vessel 10 at the temperature used, through the vessel 10 containing chlorin, which has been brought in to a liquid condition by exerting sufficient external pressure on it, or by reducing its temperature to the point of liquefaction, or by both expedients applied simultaneously, or by dissolving it in some other liquid from which the ethylenedichlorid can later be separated, or by dissolving it in ethylenedichlorid itself. This, then permits of a complete and rapid union of the ethylene and the chlorin immediately upon introducing the former gas into the liquid layer 15, giving pure ethylenedichlorid. The ethylene is continuously added, bubbling through the liquid chlorin, which is continuously supplied. If both gases are pure, no gaseous substance escapes; the pure ethylenedichlorid, a liquid, is drawn off through outlet pipe 13 controlled by valve 14.

If it should be considered desirable, the ethylene may also be reduced to the liquid condition by exerting sufficient pressure on it, or by cooling it to the point of liquefaction, or by both expedients applied simultaneously. The liquid ethylene thus obtained may be added to the liquid chlorin, or the liquid containing chlorin, and, as is the case above, unites at once with the chlorin to form pure ethylenedichlorid, free from higher chlorinated products.

Naturally, as soon as the process has proceeded a short time, the liquid content of vessel 10 contains both liquid chlorin—in case such was used at the start—and ethylenedichlorid which are mutually soluble in each other. This gives the same result as though a mixture of ethylenedichlorid and liquid chlorin were used at the start, and, indeed, such may be done with equally good results, or an inert liquid, mixed with the liquid chlorin, may be used which later can be separated from the ethylenedichlorid.

Having thus fully described my said in- vention, what I claim as new and desire to secure by Letters Patent, is:

1. The process of producing ethylenedichlorid which consists in reacting with ethylene upon chlorin in liquid phase.

2. The process of producing ethylenedichlorid which consists in passing gaseous ethylene into chlorin in liquid condition, substantially as set forth.

3. The process of making ethylenedichlorid which consists in leading gaseous ethylene through a vessel containing liquid chlorin, the pressure of the ethylene being greater than the vapor pressure of the chlorin, substantially as set forth.

In witness whereof, I have hereunto set my hand and seal at Washington, District of Columbia, this twenty-ninth day of May, A. D. nineteen hundred and sixteen.

GEORGE O. CURME, Jr. [L. S.]

Witnesses:
E. W. BRADFORD,
CHAS. E. RIORDON.